May 26, 1970  H. H. SEWARD  3,514,618
GRATING-TYPE ELECTROOPTICAL TRANSDUCER WITH LENTICULAR LENSES
Filed Sept. 12, 1968 2 Sheets-Sheet 1
FIG. 1
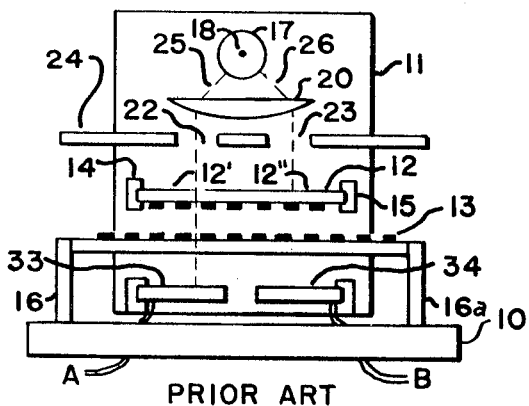
PRIOR ART
FIG. 2
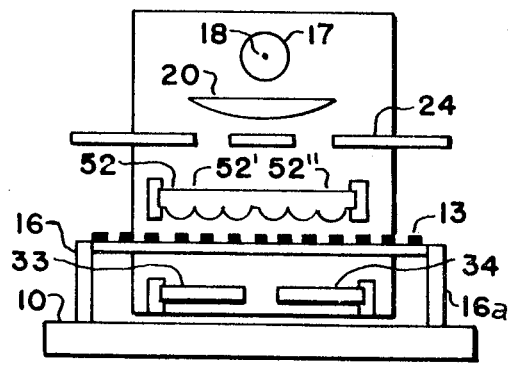
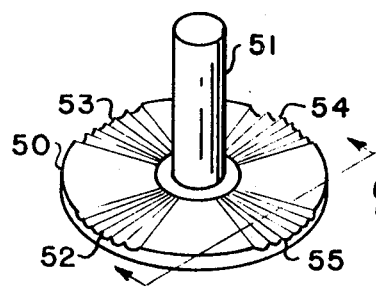
FIG. 3a
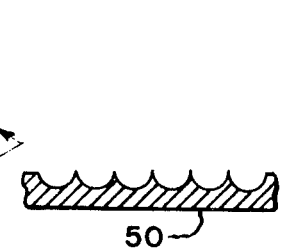
FIG. 3b
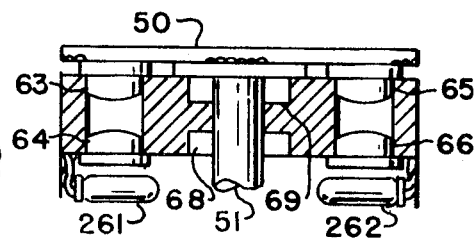
FIG. 3c
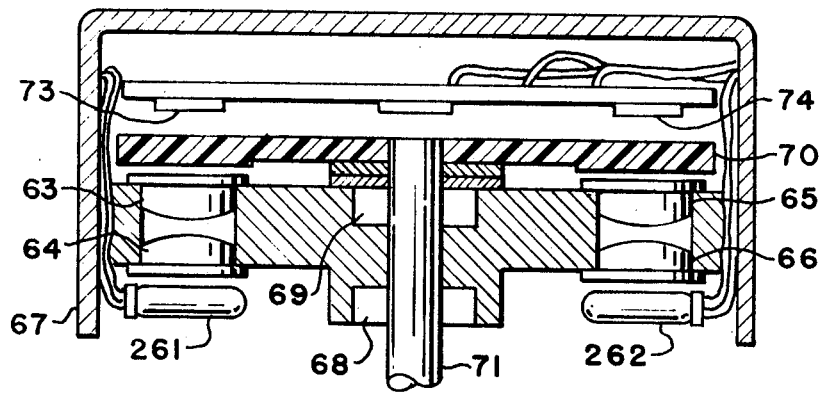
FIG. 3d
INVENTOR
HAROLD H. SEWARD
BY Jack Larsen
ATTORNEY May 26, 1970     H. H. SEWARD     3,514,618

GRATING-TYPE ELECTROOPTICAL TRANSDUCER WITH LENTICULAR LENSES

Filed Sept. 12, 1968     2 Sheets-Sheet 2

INVENTOR
HAROLD H. SEWARD
BY Jack Vareen

ATTORNEY

United States Patent Office 3,514,618
Patented May 26, 1970

3,514,618
GRATING-TYPE ELECTROOPTICAL TRANSDUCER WITH LENTICULAR LENSES
Harold H. Seward, 16 Frost St.,
Arlington, Mass. 02174
Continuation-in-part of application Ser. No. 520,446,
Jan. 13, 1966. This application Sept. 12, 1968, Ser.
No. 759,467
Int. Cl. G01d 5/34, 5/38
U.S. Cl. 250—233  17 Claims

ABSTRACT OF THE DISCLOSURE

A grating-type optical electromechanical transducer is shown wherein a fringe pattern is developed between a lenticular lens and a single grating, to provide improved optical efficiency over the prior art in which the fringe pattern is developed between a pair of gratings. Embodiments are shown for both linear and circular motion and with pairs of transducers in quadrature to show the sense of the motion. It is also shown that lenticular-lens and collimating lens elements may be combined into an integral quadrature pair.

---

Figure 4:
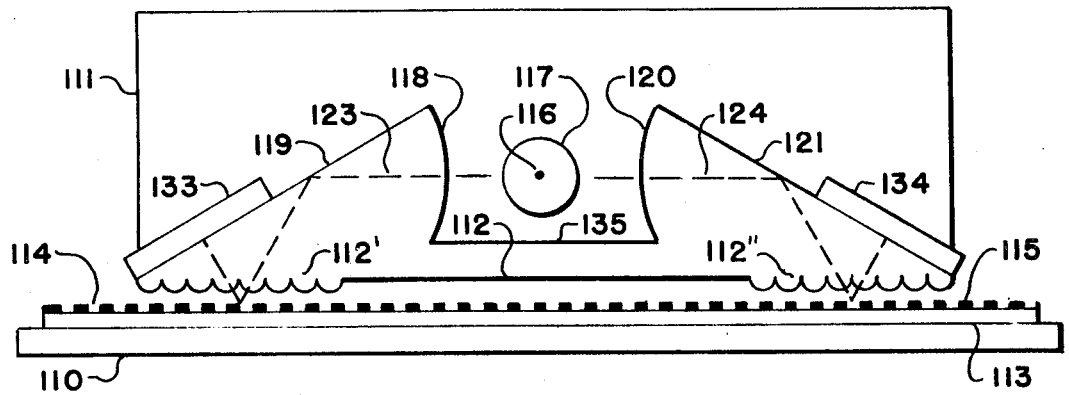

This application is a continuation-in-part of my co-pending application Ser. No. 520,446, filed Jan. 13, 1966, for Electrooptical Measuring Transducer and Lens, now abandoned. The present invention relates to measuring apparatus for determining the movement of an object in one or the other of two opposite directions with respect to some reference structure. It is known to effect such a measurement by arranging for an optical fringe pattern to be moved in correspondence as regards extent and sense with movement of the object and counting the number of fringes displaced from a fiducial line. Measuring apparatus embodying these principles is disclosed, for example in Pat. No. 2,886,717, granted May 12, 1959, to D. T. N. Williamson et al.; in Pat. No. 2,788,519, granted to W. D. Caldwell Apr. 9, 1957; and in Pat. No. 3,193,744, granted to the present applicant July 6, 1965. Apparatus of this type comprises two superimposed optical gratings, one secured to said structure and the other to said object, the gratings are ruled to produce together a cyclic coincidence pattern of alternate opacities and transparencies adapted to move with respect to the structure in dependence upon the motion of the object.

Electrical sensing of pattern movement is ordinarily provided by illuminating the gratings from one side and detecting variations in reflected or transmitted light by means of photocell devices. Where the senses of the motion as well as its amount is to be determined, a pattern is illuminated at two locations where the elements of the pattern are out of phase with one another by a fraction of one-half the cyclic wave length of the pattern, typically in quadrature, and two photoelectric devices are arranged to be illuminated by the light from the respective elements of the pattern. Logic circuitry and counters provide a measure of the motion and its direction as described in Pat. No. 2,656,106 granted Oct. 20, 1953, to H. P. Staber. A grating may be in the form of a flat linear array, a conical arrangement, a circular disc or other appropriate geometry; moreover there are known configurations wherein one of the gratings is ruled with lines which are alternatively black and reflecting. In appropriate configurations discs are translucent, in others transparent; and light may be blocked by total internal reflection as well as by absorption. In the above-mentioned Seward patent an embodiment is illustrated wherein each of the two gratings is formed by a radial pattern on a disc and the two disc are free to rotate independently relative to the optical readout elements. In that example each of the gratings is ruled continuously for a full 360 degrees. In the more usual case only one o fthe gratings is moveable relative to the photocells, the other grating, which remains fixed relative to the optical paths, need not be ruled except at the locations where the illumination is provided.

Figure 5:
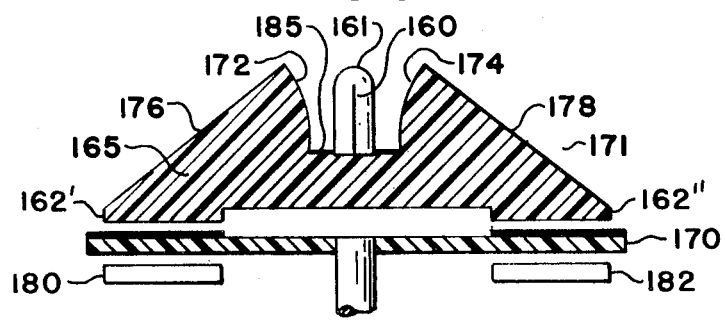
Figure 6:
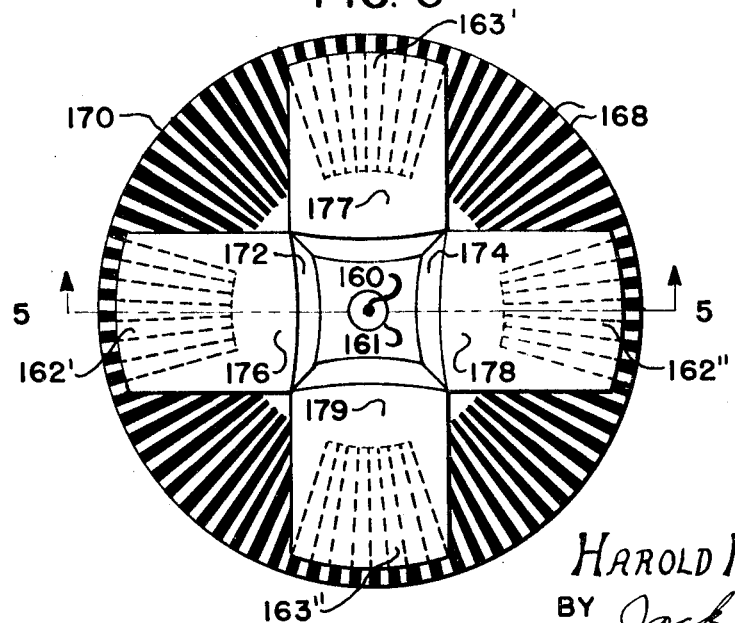

It is an object of the present invention to improve the optical efficiency of devices of this kind. Another object of this invention is to provide a grating combined with elements of the optical system in a single plastic lens. Another object of the invention is to provide a shaft-position indicator of improved efficiency, reduced size and lower cost. A feature by which these objects are achieved is the substituting for *one* of the gratings with a lenticular lens. Another feature of the invention is the combination of the lenticular lens and the collimating lens in a single plastic lens structure. A third feature of the invention is the integration of two such lenticular-lens-collimating-lens elements into an integral quadrature pair. Other features, objects and advantages of the invention will become apparent from the following specification when read in connection with the accompanying drawings in which:

FIG. 1 represents a typical device of the prior art;
FIG. 2 represents an embodiment of the present invention;
FIG. 3a is a sketch of a mold for the lenticular lens of the invention;
FIG. 3b is a section through the mold of FIG. 3a;
FIG. 3c shows the mold in molding relation to the plastic lens blanks;
FIG. 3d represents a device embodying lenses produced as shown in FIG. 3c;
FIG. 4 is a diagram of a combined collimating lens and lenticular lens for the invention;
FIG. 5 is an axial section of an alternative form of combined collimating lens, and lenticular lens, and
FIG. 6 is an axial view of the device of FIG. 5.

FIG. 1 is illustrative of a prior-art device substantially as described in the above-mentioned Williamson patent as used for determining the extent and direction of the straight-line movement of a table 10 of a milling machine with respect to the fixed bed 11 of the machine. Two superimposed parallel optical gratings are provided. One grating 12 is mounted by channels 14 and 15 to the bed 11 of the machine. The other grating 13, which is long enough to allow for the full movement of the table 10, is secured to the table by the brackets 16 and 16a. The gratings are of glass or other transparent or translucent material ruled with straight and parallel opaque lines at a spacing which is approximately the same for each grating. About 500 opaque lines per inch is typical. The width of each opaque line is approximately equal to the width of each transparent line between consecutive opaque lines. Each grating is such that the lines on it are coplanar. The lines, being normal to the plane of the paper, are indicated symbolically by rows of dots; and the spacing of the dots is greatly exaggerated. The lines on grating 13 are all evenly spaced; however, the lines on the gratings 12 are formed into two groups 12' and 12''. All of the lines of 12' are evenly spaced as are the lines of the grating 12'', however one group of lines is offset with respect to the other group; that is, when the lines of the section 12' are aligned with the lines of the grating 13 for maximum transmission. The lines of section 12'' approximately half overlap the lines of grating 13. The lines of the gratings are normal to the direction of movement o fthe table. It will be assumed for convenience of explanation that this direction is horizontal and that accordingly the lines of gratings are vertical. The gratings are illuminated by a lamp 17 mounted to the base 11. The lamp has a vertical line filament 18; and the light from this reaches the gratings by way of a collimating lens 20 and aperture 22 and 23 in the otherwise opaque wall 24. These apertures are displaced from each other in the direction of motion so that the two beams of light indicated by the broken lines 25 and 26 pass through different sections the superimposed gratings. In the path of these beams beyond the gratings are photocells 33 and 34 intercepting respectively the beams 25 and 26. The electrical outputs signals from photocells 33 and 34 are applied over separate leads A and B, respectively, to an electronic circuit (not shown) and counters by which the motion of the table with respect to the base is determined. Because the lines of section 12' are offset relative to the lines of the section 12" the electrical signals appearing at A and B are in quadrature. As described in the above mentioned Caldwell and Seward patents, and especially Stabler Pat. No. 2,656,106 issued Oct. 20, 1953, a quadrature arrangement permits the electronics to keep track of the position of the table relative to the bed even as the motion is reversed. If motion in one direction only, then only one photocell and one grating section is needed.

FIG. 2 represents the modification of such a device in accordance with the present invention. In place of the grating 12 fastened to the base 11 there is substituted a lenticular lens 52 divided into two quadrature sections 52' and 52" which project from the lamp 17 onto the surface of the grating 13 the same kind of bright line pattern which results from the shadows cast by the rulings of the grating 12; however, since little light is absorbed in the lens 52 the lines which are images of the lamp filament 23 are substantially twice as bright as they are in the embodiment of FIG. 1. The lenticular lens comprises a plurality of cylindrical convex surfaces evenly spaced and having the same curvature.

The lenses are preferably formed by a replica process. A grating pattern is embossed in a metal plate using a spherical diamond-tipped tool thereby forming a series of cylindrical grooves. Pressing these grooves against a softened plastic surface produces the required lenticular lens.

Devices may be circular to measure rotation rather than translation. FIG. 3a represents a disk embossed with such a pattern for a radial-line grating as required for a device of the kind shown in FIG. 6 of the above mentioned Seward Pat. No. 3,193,744. In the device there disclosed a set of four lamps and four photocells are employed. The disc 50 is perpendicular to and coaxial with its shaft 51. On the disc 50 are embossed four groups 52, 53, 54 and 55 of cylindrical grooves.

FIG. 3b represents the resulting pattern greatly exaggerated shown in a section taken along the line 3b of FIG. 3a. The embossed grating disk 50 is installed in a device in the manner shown in FIG. 3c. Of the four lamps two 261 and 262 are shown which are collimated by plastic lenses 63, 64, 65 and 66 which are placed in pairs in holes throuhg a body 67 having central bearings 68 and 69. The shaft 51 is inserted into the bearings and located by these bearings. The pattern is transferred from the disk 50 to the plastic lenses by heat and pressure or by polymerizing a portion of the plastic in contact with the plate. The plate is then removed and a working opaque and clear grating disk 70 having a shaft 71 substituted therefore as shown in FIG. 3d. The device is completed by the addition of photocells 73 and 74; and by adjusting the lamps 261 and 262 which are cemented rigidly in place.

FIG. 4 represents a linear embodiment of the invention suitable for measuring the motion of a table 110 of a milling machine with respect to the fixed bed 111 of the machine as for FIG. 1. A grating 113 of the reflecting type is opposed by a plastic lens piece 112 having two lenticular lens surfaces 112', 112", the lenticular lens sections 112' and 112" are in quadrature relative to the opposing grating 113. For purposes of explanation it will be considered that the axis of the lenticular lenses are vertical. The lens sections 112' and 112" are illuminated by a lamp 117 mounted on the base 111. The lamp has a vertical line filament 116; and light from it reaches the gratings 112' and 112" by way of a collimating surface 120 and totally internally reflecting surface 121 which define beams indicated by dotted lines 123 and 124 respectively. These beams are focused into a bright line pattern on the surface of the reflecting grating 113. When these bright lines impinge on the reflecting portions of the surface 113 the rays are reflected back through the grating sections 112' or 112" which recollimates the beams and direct them against the photocells 133 or 134 respectively. The surface 135 is blackened to diminish interference by stray light.

The detailed design of the piece 112 is very complex in theory; and in practice is probably best approached by a trial-and-error process. The number of lines per inch of the grating is one important feature relating to the quality of image required, the exigencies of the plastic molding process, the cost of dies, etc., require balancing of factors on an economic rather than theoretical basis. A major factor is the volume of production which may be achieved. In any case, the surfaces 118 and 120 probably must not form an acute angle with the surface 135 if a simple mold is to be used. Further, forming the collimated beam will generally be by both refraction at the convex surfaces 118 and 120 and by some curvature in the reflecting surfaces 119 and 121. The bright line pattern which is modulated by motion of the grating will not be sharply defined but will be the resultant of refracted, diffracted, and scattered light. The test is that the output signals are substantially sinusoidal with motion of the grating 113, and that an optimum economic efficiency is achieved. This will be in the case of each special installation the result of evolutionary modifications of an initial design.

FIG. 5 represents a radial section of an alternative embodiment of the invention in a device similar to that shown in FIG. 3d but wherein a single lamp 161 having a line filament 160 along the axis of the instrument provides illumination for all surrounding lenticular lens sections 162', 162", 163', and 163" having axes radially disposed. Having alternatively opaque sectors 168, translucent grating disk 170 rotates parallel to the axes of the lenticular sections 162'-163" and coaxial with the axis of symmetry of the lens assembly 171 comprising the body 15 and the lenticular sections 162' etc., as also shown in FIG. 6. Light from the lamp 161 is collimated by the surfaces 172 and 174, totally internally reflected by the surfaces 176 and 178 formed into line patterns by sections 162' and 162". At one position of the disk 170 relative to the section 162' the bright line pattern formed by the section 162' impinges on the disk 170 between opaque lines 168 and therefore passes through substantially without attenuation to be intercepted by the photocell 180. Because of the quadrature arrangement at the same position, the bright line pattern formed on the surface of the disk 170 by the section 162" falls entirely on the black sectors 168, the image from each element of the section 162" falling on a different black sector. At this position, therefore, light from the lamp 161 is blocked from the photocell 182. Bright line images formed by the sections 163' and 163" fall at intermediate positions, substantially at the edges of the black sectors so that light received by the corresponding photocells (not shown) is substantially half attenuated. Because, under ideal conditions, the line images may be very sharp, the number of black sectors 168 opposing a lens section need not be equal to the number of black sectors 168 opposing a lens section need not be equal to the number of elements in the lens, but may be a multiple thereof. Thus with the lens elements each ¼°, one-quarter degree, in width, the opaque sectors might be 7½' (seven and one-half minutes) in width, 3¾' in width or 1¼' in width, or more likely one of these values multiplied by $N/(N+1)$ or 1440/1441 for the example just given, as is known in the art of fringe-generating devices. In any case a black sector and an adjacent clear sector together span substantially the same angle as an opposing lens element or an even integral submultiple thereof so that for the number of sectors in the field of one photocell, at least eight in a practical device, there will be one position for which each of the eight or more bight line images illuminates the photocell, and another position for which transmission is substantially minimum for all of the eight of more successively adjacent lens segments.

As with the fabrication of the piece 112, the assembly 171 is not necessarily optimized when (as shown) the surface 174 collimates, the surface 178 is a conical reflector, and when the elements of the lenticular sections have their astigmatic focal length equal to the separation between the lenses and the disk 170. Although the indicated structure is presently preferred, optimum design may include silvering the surface 185 to extend the apparent length of the filament 160 and the surfaces 174 and 178 may be astigmatic to the end that rays as the result of the combined effect of surfaces 174, 178, and the lenticular surfaces travel from the filament to a first astigmatic focus in the plane of the grating, while still converging in the radial direction to the second astigmatic focus situated to optimize the signal from the photocells.

FIG. 6 shows an axial view of the structure of FIG. 5 showing the additional totally internally reflecting surfaces 177 and 179 provided for the remaining two photocells not shown. In the view, established drafting practice is followed in ignoring the refractive effect of the plastic would would have the effect of squeezing the areas occupied by the sections 162', 162", 163', 163" to the outside, and enlarging the apparent central angles of the sectors 168 and of the lenticular lens elements. Thus the view is not as it would appear, but as it would appear with a sort of "X-ray vision."

It will be obvious that many other configurations and modifications of the geometry of the parts and surfaces conical, cylindrical and plane will be apparent to those skilled in the art. In particular, while lenticular lenses having three, seven, and eight elements are shown in the drawings, and elements comprising 3, 4, and 5 elements are claimed and twenty-five and more grating elements are shown and claimed, it will be understood the specific numbers shown and claimed are selected only to simplify the drawings and the language of the claims, in practice, as stated above, the spacings of elements would be hundreds to the inch and much larger numbers, "comprising" 3, 4, 5, or 24 plus many more would actually be employed.

Numerous other uses and modifications for and departures from the specific apparatus described herein will be now apparent to those skilled in the art without departing from the inventive concepts; consequently the invention is to be construed as limited only by the spirit and scope of the appended claims.

I claim:
1. An electro-optical transducer by which relative motion of an object relative to a structure is detected, comprising
    (a) a grating fixed to said object having more than twenty-four sections of like width, side by side in a motion direction, said sections having alternately optically contrasting first and second properties, said sections being elongated in a direction transverse to said motion direction, and transverse to a light path between said body and said object,
    (b) a first lenticular lens fixed to said structure and comprising five elongated cylindrical refracting elements, side by side, of like focal length, the axes of said elements having an even spacing of substantially twice said width, and
    (c) means for constraining in said motion the surface containing said axes in saptial substantially parallel opposing relationship with said grating, and at a first position of said relative motion situating each element of said lens in parallel opposing relationship with a corresponding arc and only one of said first property sections, each said element spaced apart from said corresponding section at substantially said focal length along said path, and at a second position of said relative motion situating each of said elements in parallel opposing relationship with a matching one and only one of said second property sections, each said element spaced apart from said matching section at substantially said focal length along said path.

2. Apparatus as defined by claim 1 in further combination with
    (a) a second lenticular lens fixed to said first lens and comprising four elongated cylindrical four elements having substantially the same even spacing and same focal length as said five elements, and having axes in said surface, and
    (b) means for situating said second lens in spaced parallel opposing relationship with said grating at a third position of said relative motion substantially different from said first and second positions with each of said four elements of said second lens in parallel opposing relationship with an individual one of said first property sections, and at a fourth position, substantially different from said other positions, situating each of said four elements in parallel opposing relationship with one of said second property sections.

3. A device as defined by claim 1 wherein said lenticular lens comprises an optically clear refractive body having
    (a) a lenticular refracting surface comprising five convex juxtaposed cylindrical elements having axes extending in said transverse direction
    (b) a smooth internally reflecting surface inclinedly opposing said refracting surface, and
    (c) a convex collimating surface generally perpendicular to said lenticular surface, the curvatures and inclinations of said surfaces being proportioned relative to the index of refraction of said body so that light from a straight lamp filament situated before siad collimating surface is gathered by said collimating surface and directed toward said reflecting surface so as there to be redirected as a substantially collimated beam toward said lenticular surface, and by said five elements concentrated into an array of five line images of said filament each extending substantially parallel to said axes.

4. A device as defined by claim 3 having on said body
    (a) a second lenticular refracting surface comprising four convex juxaposed cylindrical elements having axes extending in said transverse direction,
    (b) a second smooth internally reflecting surface inclinedly opposing said second refracting surface, and
    (c) a second convex collimating surface generally perpendicular to said second lenticular surface.

5. A device as defined by claim 3 wherein said transverse direction is radial.

6. A device as defined by claim 4 wherein said transverse direction is radial.

7. A device as defined by claim 3 wherein said axes are parallel.

8. A device as defined by claim 4 wherein said axes are parallel.

9. A device as defined by claim 8 wherein said axes are parallel to said filament.

10. A device as defined by claim 6 wherein said axes are perpendicular to said filament.

11. A transducer as defined by claim 1 wherein said first property is translucence and said second property is opacity.

12. A transducer as defined by claim 9 wherein said first property is translucence and said second property is reflectance.

13. In combination a lens as defined by claim 9, a lamp having a straight filament fixed between said collimaitng surface so that the light of the filament of said lamp is gathered by said collimating surfaces and redirected toward said lenticular surfaces, said grating having alternate opaque and reflecting sections elongated in said transverse direction, and a photocell fixed to said second internally reflecting surfaces facing said four elements.

14. A transducer as defined by claim 1 wherein said first property is translucence.

15. A transducer as defined by claim 14 wherein said transverse direction is radial.

16. A transducer as defined by claim 1 wherein said axes are parallel and extend in said transverse direction.

17. An electrooptical transducer by which relative motion of an object relative to a structure is detected, comprising
   (a) a grating fixed to said object having more than twenty-four sections of like width, side by side in a motion direction, said sections having alternately optically contrasting first and second properties, said sections being elongated in a direction transverse to said motion direction, and transverse to a light path between said body and said object,
   (b) a first lenticular lens fixed to said structure and comprising three elongated cylindrical refracting elements, side by side, of like focal length, the axes of said elements having an even spacing of substantially twice said width, and
   (c) means for constraining in said motion the surface containing said axes in spatial substantially parallel opposing relationship with said grating, and at a first position of said relative motion situating each element of said lens in parallel opposing relationship with a corresponding one and only one of said first property sections, each said element spaced apart from said corresponding section at substantially said focal length along said path, and at a second position of said relative motion situating each of said elements in parallel opposing relationship with a matching one and only one of said second property sections, each said element spaced apart from said matching section at substantially said focal length along said path.

References Cited

UNITED STATES PATENTS

| | | | |
|---|---|---|---|
| 3,096,441 | 7/1963 | Burkhardt | 356—170 |
| 3,114,046 | 12/1963 | Cabaniss et al. | |
| 3,175,093 | 3/1965 | De Lang. | |
| 3,344,700 | 10/1967 | Brake. | |

JAMES W. LAWRENCE, Examiner

V. LAFRANCHI, Assistant Examiner

U.S. Cl. X.R.

250—220, 237; 340—271; 356—170